C. P. KLORER.
INK FOUNTAIN PARTITION.
APPLICATION FILED APR. 28, 1921.

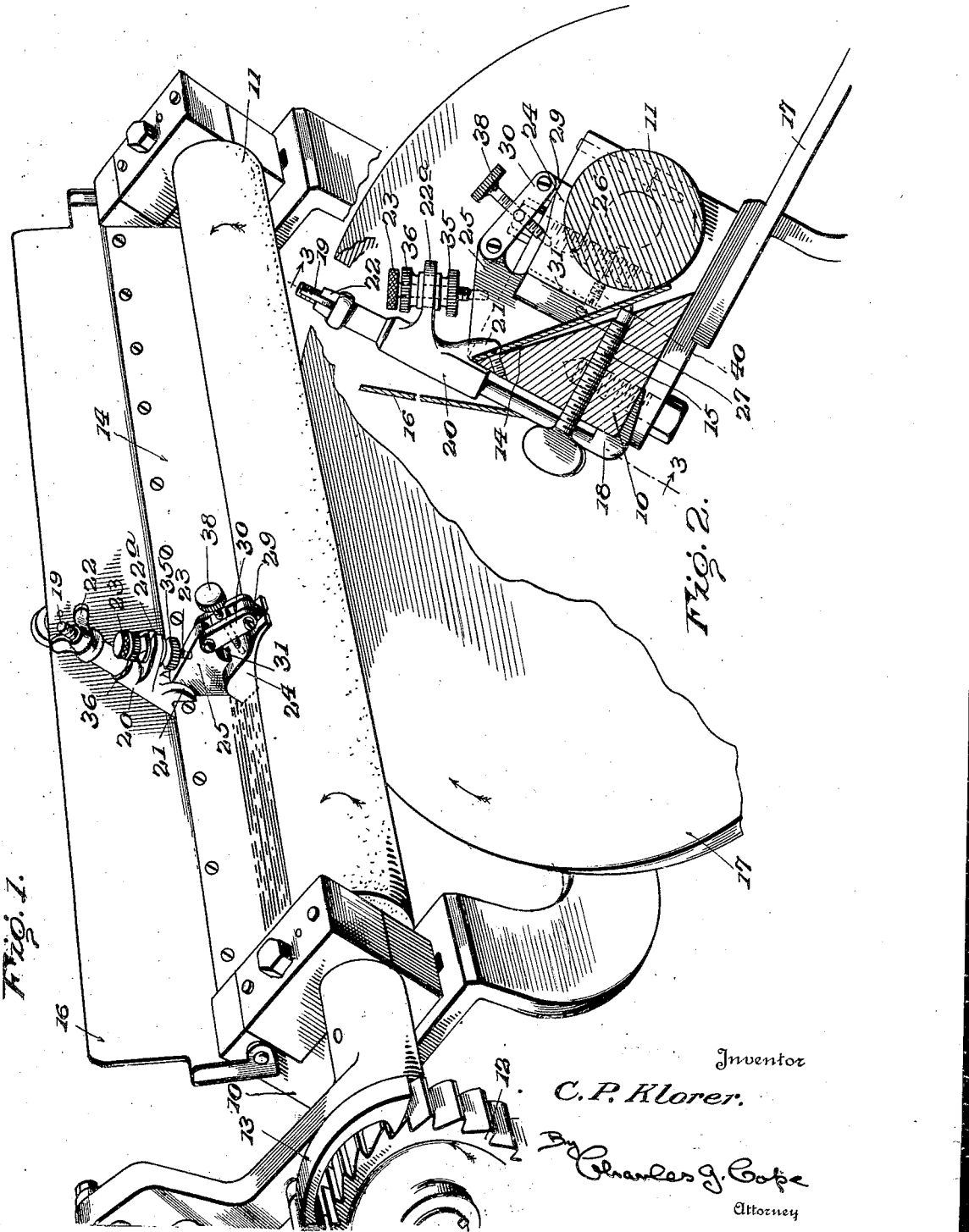

1,433,954.

Patented Oct. 31, 1922.
2 SHEETS—SHEET 2.

Inventor
C. P. Klorer.
By Charles J. Cooke
Attorney

Patented Oct. 31, 1922.

1,433,954

UNITED STATES PATENT OFFICE.

CHARLES P. KLORER, OF PITTSBURGH, PENNSYLVANIA, ASSIGNOR TO MILLER SAW-TRIMMER COMPANY, OF PITTSBURGH, PENNSYLVANIA, A CORPORATION OF PENNSYLVANIA.

INK-FOUNTAIN PARTITION.

Application filed April 28, 1921. Serial No. 465,305.

*To all whom it may concern:*

Be it known that I, CHARLES P. KLORER, a citizen of the United States, residing at Pittsburgh, in the county of Allegheny and State of Pennsylvania, have invented new and useful Improvements in Ink-Fountain Partitions, of which the following is a specification.

My invention pertains to ink-fountain partitions, and relates especially to partitions for use in varying the effective length of ink-fountains, particularly such ink-fountains as include an elongated fountain roll having cooperating therewith a base a surface of which is disposed at an angle to the roll, so as to produce, with the roll, an ink receptacle of angular shape in cross section.

In the use of an ink-fountain, it frequently happens that a less quantity of ink is needed than would be supplied by the fountain if the entire length thereof were utilized. It has been proposed to provide, for use in such cases, a partition capable of being placed at any desired position in the fountain, thereby limiting the effective length of the fountain to that space which extends between one end thereof and such partition. In this way ink is saved, and the amount of work necessary to be done in washing up the fountain for a new job is reduced. It is an object of my present invention to improve generally upon partitions for thus varying the effective length of an ink-fountain. Another object of my invention is to provide a partition which will be especially effective in producing an efficient closure against the leakage of ink past it. It is a further object of my invention to provide a partition capable of producing an effective seal regardless of variations which may occur in the angular disposition of the parts of the fountain in connection with which it is to be used. Still another object of my invention lies in the production of a partition the principal ink contacting portions of which may be removed with ease and speed, and also in the production of a partition which may be quickly and readily shifted from one desired position to another. Other and further objects will appear from the following specification taken in connection with the claims forming a part thereof.

By way of example, I have described in the following specification, and shown in the accompanying drawings, one form of ink-fountain-partition constructed in accordance with my invention, the same being shown and described as applied to an ink-fountain of well known characteristics. I wish it to be understood, however, that my invention may be embodied in other forms, and that changes may be made in the form described and shown without exceeding the scope thereof as defined in the appended claims.

In the drawings:

Fig. 1 is a perspective view of an ink-fountain of a well known type, having my improved partition applied thereto;

Fig. 2 is a sectional view, the partition being shown in side elevation;

Figure 3:
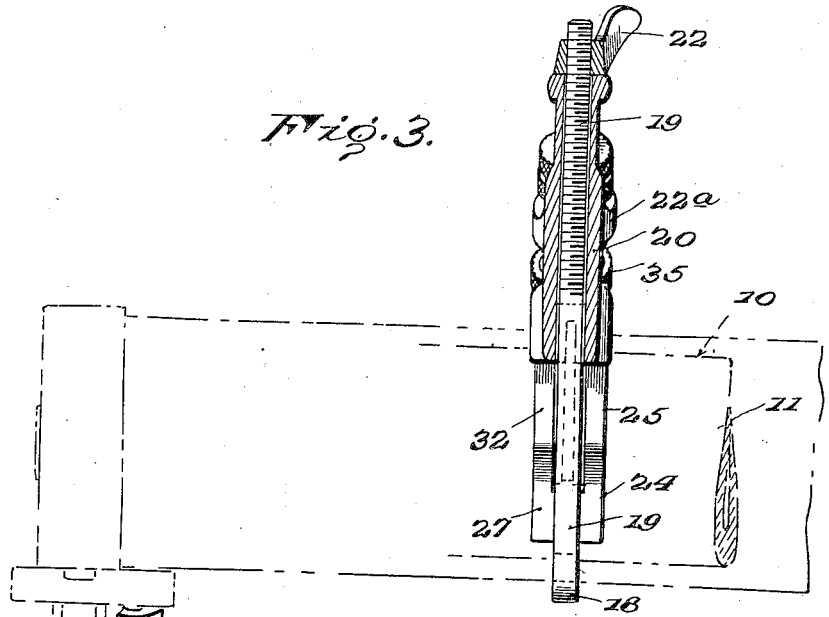
Fig. 3 is a section through the supporting clamp of the fountain-partition, the section being taken on the line 3—3 of Fig. 2, looking in the direction of the arrows.
Figure 4:
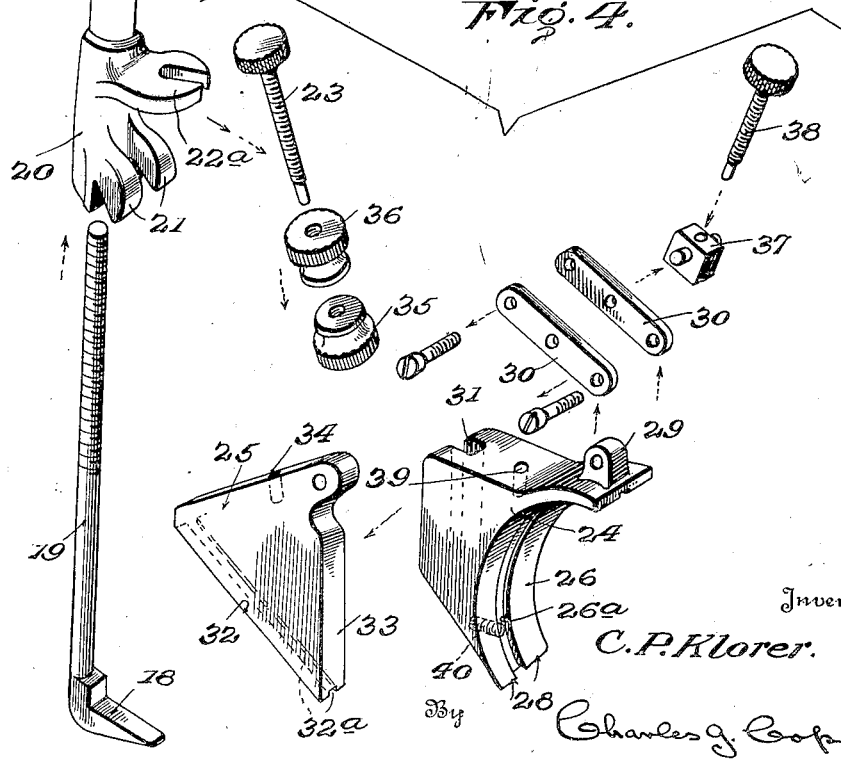
Fig. 4 is a perspective view showing the various parts of my improved fountain-partition disassociated from each other.

Referring now to the drawings, the ink-fountain shown therein comprises a fountain bed 10 in which is rotatably mounted the fountain roll 11, the latter being provided at one end with a ratchet 12 with which cooperates an automatically actuated pawl 13, whereby the fountain roll 11 is intermittently given a short rotating movement in the direction of the arrows. Cooperating with the fountain roll 11 is a blade 14, secured to the fountain bed 10, the free edge of which blade is adjustable, by means of screws 15, towards and away from the fountain roll 11. According to the adjustment of the blade 14, the fountain roll 11 will carry upon its face a thicker or thinner film of ink as it rotates. Such a fountain is usually provided with a cover 16, which closes the fountain when not in use. The composition inking rolls of the press strike the fountain roll 11 at the limit of their upward movement and thus receive ink therefrom, carrying such ink to the usual ink disc 17 by means of which the ink is distributed on the inking rolls.

My improved partition includes a supporting clamp which comprises a hook 18, upon the stem 19 of which is mounted a sleeve 20, such sleeve being provided with angularly extending clamp ears 21 adapted to engage the top face of the fountain blade 14, near the rear edge of the latter. A wing nut 22 is provided on the stem 19, whereby the sleeve 20 may be forced downward on the stem 19, thereby causing the supporting clamp to be secured in position by the clamping action of the hook 18 and the ears 21 against the fountain base. To place the supporting clamp in position, or to move said supporting clamp from one position to another, it is merely necessary to manipulate the wing nut 22 to tighten or loosen the clamp, the clamp being manually placed in position wherever desired on the fountain bed. The sleeve 20 of the supporting clamp is provided with a forwardly projecting pressure ear 22$^a$ through a frontwardly-opening slot in which passes a screw-threaded pressure pin 23.

The partition further includes two closure elements having a sealing engagement with each other, of which elements the element 24 engages the fountain roll 11 and the element 25 engages the fountain blade 14. The roll-engaging element 24 is formed with a concave arcuate surface 26 of a curvature corresponding to that of the fountain roll, such surface being broken by a central groove 26$^a$ running lengthwise thereof, and is further formed with a plate contacting surface 27 which engages as closely as possible against the fountain blade 14 at the part of the latter close to the fountain roll. The surfaces 26 and 27 form with each other a sharp edge 28, which enters closely into the sharp angle formed between the fountain blade 14 and the roll 11. The roll-engaging member 24 is formed, at its front part, with an upwardly extending boss 29, to which is pivoted a link 30 consisting of a pair of bars spaced apart and embracing the boss 29 between them, the opposite end of such link being pivotally connected with the blade-engaging member 25.

The blade engaging member 25 is of a thickness to enter between the ears 21 of the sleeve 20 of the supporting clamp, and to enter a slot 31 formed in the rear part of the roll-engaging member 24. Its bottom surface 32 is broken by a central groove 32$^a$ running lengthwise thereof. When the partition is in place on the fountain, the member 25 engages, with its bottom surface 32, against the fountain blade 14, and, with its front edge 33, in the slot 31 of the roll-engaging member. Thus, with the two elements 24 and 25 properly secured in position in the manner hereinafter to be described, the ink in one end of the fountain is prevented from passing by the partition by the engagement of the surfaces 26 and 27 of the element 24 against the roll 11 and the fountain blade 14 respectively, the engagement of the front edge 33 of the element 25 in the groove 31, and the engagement of the surface 32 of the element 25 against the fountain blade 14. The groove 26$^a$ and 32$^a$ of the elements 24 and 25 become, in practice, clogged with ink, which acts as a packing and assists in preventing ink from passing by the partition into the portion of the fountain not intended to be in use.

The element 25 is formed with a small pit 34 for receiving the end of the pressure pin 23. Upon this pin is threaded a thumb nut 35, for engaging the lower side of the pressure ear 22$^a$, and a lock nut 36 for engaging the top side of such ear. When said pressure pin 23 is in place in the slot of the pressure ear 22$^a$ with its end engaging in the pit 34, and the nut 35 is tightened against the ear 22$^a$, the result will be that the pin will insert a downward pressure upon the element 25 and will force the lower face 32 of the latter downward upon and along the fountain blade 14, the front edge 33 being forced downward in the groove 31 of the element 24.

Pivoted between the bars of the link 30, connecting the elements 24 and 25, is a block 37, with which a pressure screw 38 has threaded engagement, such screw passing through the pivoted block and entering a pit 39 in the upper face of the element 24. By turning the pressure screw 38, the element 24 is subjected to downward pressure in a direction substantially tangential to the fountain roll 11, whereby, with the surface 26 engaging firmly against the fountain roll, the surface 27 is pressed firmly down upon the fountain blade 14, the edge 28 being forced closely into the narrow throat formed between the fountain blade and the fountain roll.

In order to compensate for variations of the angle of the fountain blade 14 in individual ink fountains, as well as for the variation of the angle of such blade due to adjustment thereof by means of the screws 15, I provide the roll-engaging element 24 with a small adjusting screw 40, the head of which projects into the groove 31 and is engaged by the edge 33 of the blade-engaging element 25 when the latter is forced down by the action of the pressure pin 23. It will be observed that the relative angles between the elements 24 and 25 can be varied by altering the amount by which the screw 40 projects into the groove 31; so that by adjusting the screw 40 the elements 24 and 25 may be caused to assume the proper angle, with respect to each other, for effecting a proper contacting of these elements with the parts of the ink fountain with which they respectively engage.

The ink-fountain-partition described herein has the advantage that, whilst it may be easily and quickly adjusted to any position upon the fountain, it does not involve the boring of any holes in the latter or any other change in the structure thereof; nor does it involve any parts which would be in the way, or hinder free access being had to the ink in the fountain. The device has the further advantage that the chief ink-contacting portions, viz, the elements 24 and 25, can be removed easily and quickly by simply loosening the nut 35 on the pressure pin 23. The elements 24 and 25 when removed from the fountain, can be spread and are thus easily cleaned. Other advantages of the ink-fountain-partition described herein lie in the fact that it provides for a simultaneous pressure against the fountain roll 11 and against the fountain-blade 14, that this simultaneous pressure can be exerted regardless of any variation in the angle of the fountain-blade, and that the partition enters closely into the narrow throat between the fountain blade and roll, a place where leakage of ink would otherwise be especially likely to occur.

Having thus fully described my invention what I claim as new and desire to secure by Letters Patent is:

1. An ink-fountain-partition comprising a blade-engaging member, a roll-engaging member movably associated therewith, and a link connecting said members.

2. An ink-fountain-partition comprising a blade-engaging member, a roll-engaging member movably associated therewith, a link connecting said members, and means carried by said link for exerting pressure on one of said members.

3. An ink-fountain-partition comprising a blade-engaging member, a roll-engaging member movably associated therewith, a link connecting said members, and means carried by said link for exerting pressure on said roll-engaging member.

4. An ink-fountain-partition comprising a support, a blade-engaging member movably associated with said support, a roll-engaging member movably associated with said blade-engaging member, means for exerting pressure on said blade-engaging member, a link connecting said members, and means carried by said link for exerting pressure on said roll-engaging member.

CHARLES P. KLORER.

Witnesses:
Theo. R. Foster,
M. L. Reick.